United States Patent [19]

Greenberger et al.

[11] Patent Number: 5,379,243

[45] Date of Patent: Jan. 3, 1995

[54] METHOD AND APPARATUS FOR PERFORMING FINITE FIELD DIVISION

[75] Inventors: Haim Greenberger, Kiryat Tivon, Israel; Yoav Hebron; Sreenivasa A. Raghavan, both of San Diego, Calif.

[73] Assignee: Comstream Corporation, San Diego, Calif.

[21] Appl. No.: 938,109

[22] Filed: Aug. 31, 1992

[51] Int. Cl.[6] .............................................. G06F 7/52
[52] U.S. Cl. ................................... 364/746.1; 364/761
[58] Field of Search ............................. 364/746.1, 761

[56] References Cited

U.S. PATENT DOCUMENTS

| | | | |
|---|---|---|---|
| 4,567,568 | 1/1986 | Inagawa et al. | 364/761 |
| 4,574,361 | 3/1986 | Inagawa et al. | 364/761 |
| 4,975,867 | 12/1990 | Weng | 364/746.1 |
| 4,989,171 | 1/1991 | Hollman | 364/746.1 |
| 4,994,995 | 2/1991 | Anderson et al. | 364/746.1 |
| 5,185,711 | 2/1993 | Hattori | 364/746.1 |

OTHER PUBLICATIONS

Lin, Khuang Yung, "Architecture for VLSI Design of Reed–Solomon Decoders," *IEEE Transactions on Computers*, vol. C–33, No. 2 pp. 178–189 (Feb. 1984).

Hsu, I. S., et al, "The Design Plan of a VLSI Single Chip (255, 223) Reed–Solomon Decoder," *TDA Progress Report*, 42–91 Jetg Propulsion Laboratory, Pasadena, Calif, pp. 186–199 (Jul.–Sep. 1987).

Berlekamp, *Algebraic Coding Theory*, pp. 36–44 (McGraw–Hill, 1968).

Clark, G. C., et al, *Error-Correction Coding for Digital Communications*, Plenum Press 1981, pp. 195–201.

*Primary Examiner*—Roy N. Envall, Jr.
*Assistant Examiner*—Chuong D. Ngo
*Attorney, Agent, or Firm*—Townsend and Townsend Khourie and Crew

[57] ABSTRACT

An apparatus and method are provided for simplifying a finite field division, including inputs for the initial condition signals $a(x)$, $b(x)$, and $p(x)$, and providing at an output node the signal $c(x)$, where $c(x)=a(x)/b(x)$ without intermediate inverter circuitry for finding $1/b(x)$. A reference register initialized to $b(x)$, and a divider register initialized to $a(x)$. Both registers are manipulated in parallel by a logic circuit which responds to the contents of the reference register, converting its contents to 1.Claim By applying the same manipulations to the divider register, its contents are converted from $a(x)$ to $a(x)/b(x)$.

One embodiment of a finite field divider according to the present invention is used to provide a single finite field division of a single set of values $a(x)$, $b(x)$ and $p(x)$. Another embodiment processes continuous streams of $a(x)$, $b(x)$ and $p(x)$ values, to provide a continuous stream of $c(x)$ values delayed by a calculation time. In yet another embodiment, $p(x)$ is not a stream of values, but a constant either applied to the $p(x)$ input of the finite field divider circuit or a constant defined by fixed circuit elements within the divider circuit.

21 Claims, 11 Drawing Sheets

| STATE | OUTPUTS | | |
|---|---|---|---|
| | $S_1$ | $S_2$ | $S_3$ |
| RESET | 0 | 0 | 0 |
| CALC0 | 0 | 0 | 1 |
| CALC1 | 0 | 1 | 0 |
| CHKRES | 0 | 1 | 1 |
| HOLD | 1 | 0 | 0 |

FIG. 4 - STATE MACHINE OUTPUTS

| CURRENT STATE | INPUTS | | | | NEW STATE |
|---|---|---|---|---|---|
| | INIT | $I_1$ | $I_2$ | $I_3$ | |
| * | 1 | * | * | * | RESET |
| RESET | 0 | * | * | * | CALC0 |
| CALC0 | 0 | 1 | * | * | CALC0 |
| | 0 | 0 | * | * | CALC1 |
| CALC1 | 0 | * | 1 | * | CHKRES |
| | 0 | * | 0 | * | CALC0 |
| CHKRES | 0 | * | * | 1 | HOLD |
| | 0 | * | * | 0 | CALC0 |
| HOLD | 0 | * | * | * | HOLD |

\* = DON'T CARE

FIG. 5 - STATE MACHINE STATE TRANSITIONS

| | INPUTS | | | OUTPUTS | | | | | | | | | | | FLOW BLOCK |
|---|---|---|---|---|---|---|---|---|---|---|---|---|---|---|---|
| STATE | $I_1$ | $I_2$ | $I_3$ | LD_1E | LD_12 | LD_11 | LD_21 | LD_22 | LD_2E | LD_2X | LD_T1 | LD_TT | $O_W$ | $O_O$ | |
| RESET | * | * | * | 1 | 0 | 0 | 0 | 0 | 1 | 0 | 0 | 0 | 0 | 1 | 82 |
| CALC0 | 1 | * | * | 0 | 0 | 1 | 0 | 1 | 0 | 0 | 0 | 1 | 0 | 1 | 86 |
| CALC0 | 0 | * | * | 0 | 0 | 1 | 0 | 0 | 0 | 1 | 0 | 0 | 0 | 1 | 88 |
| CALC1 | * | 1 | * | 0 | 1 | 0 | 1 | 0 | 0 | 0 | 0 | 0 | 0 | 1 | 94 |
| CALC1 | * | 0 | * | 0 | 0 | 1 | 0 | 1 | 0 | 0 | 1 | 0 | 0 | 1 | 92 |
| CHKRES | * | * | 1 | 0 | 0 | 0 | 0 | 0 | 0 | 0 | 0 | 0 | 1 | 0 | 98 |
| CHKRES | * | * | 0 | 0 | 0 | 1 | 0 | 1 | 0 | 0 | 1 | 0 | 0 | 1 | 97 |
| HOLD | * | * | * | 0 | 0 | 0 | 0 | 0 | 0 | 0 | 0 | 0 | 0 | 1 | 99 |

\* = DON'T CARE    $I_1$ = (DEG(R2) > DEG(RT));  $I_2$ = (DEG(R2) < DEG(R1));  $I_3$ = (R1 = 1)

FIG. 6 - LOGIC AND CONTROL

METHOD AND APPARATUS FOR PERFORMING FINITE FIELD DIVISION

BACKGROUND OF THE INVENTION

This invention relates to digital telecommunications and signal processing and more particular to digital techniques for performing operations on elements in finite fields. Division of finite field elements in a Galois field, a particular type of finite field, is needed in many applications including algebraic decoding of block codes used in digital communications. A specific example is the calculation of error values in a Reed-Solomon decoder.

Operations on finite field $GF(q^m)$ elements, such as division of one element by another element, are known in the prior art. Division can be done by finding the inverse of the divisor and multiplying the inverse by the dividend. One circuit for inverting a finite field element contains a pre-computed inverse for each field element, stored in a Read Only Memory (ROM). Another circuit implements a recursive inverter using a variation of Euclid's algorithm. The inverse computation using a ROM is suggested in Kuang Yung Lin, "Architecture for VLSI Design of Reed-Solomon Decoders", *IEEE Transactions on Computers*, Vol. C-33, No. 2, pp. 178–89 (Feb. 1984), and in I. S. Hsu et al., "The Design Plan of a VLSI Single Chip (255, 223) Reed-Solomon Decoder", *TDA Progress Report* 42–91, Jet Propulsion Laboratory, Pasadena, Calif., pp. 186–99 (July–Sept 1987). A recursive inverter using Euclid's algorithm for finding the inverse of a finite field element is shown in Berlekamp, *Algebraic Coding Theory*, pp. 36–44 (McGraw-Hill, 1968).

The ROM circuit can handle faster data rates since the ROM circuit can provide an inverse element one clock cycle after receiving an element, but the complexity of such a ROM circuit grows exponentially with m, the dimension of the finite field. A recursive inverter requires 2m clock cycles to complete the inverse calculation, but the circuit's complexity only grows linearly with m.

The recursive inverter using Euclid's algorithm for finding the inverse of an element in a finite field $GF(q^m)$ works as follows. Let $p(x)$ be a primitive polynomial of the finite field $GF(q^m)$, $b(x)$ be an element in $GF(q^m)$, and $w(x)$ be the inverse of $b(x)$, where $b(x) \neq 0$, $$p(x) = p_0 + p_1 x + \ldots + p_m x^m, \quad (1)$$

$$b(x) = b_0 + \ldots + b_{m-1} x^{m-1}, \quad (2)$$

$$w(x) = \frac{1}{b(x)}, \quad (3)$$

and where $\{b_i\}$, $\{p_i\}$ are elements of the base field $GF(q)$. Euclid's algorithm for finding $w(x)$ is described by the following recursion:

Step 0: (initial conditions)

$$w_{-1}(x) = 0,\ w_0(x) = 1,\ r_{-1}(x) = p(x),\ r_0(x) = b(x) \quad (4)$$

Step i, for $i > 0$:

$$w_i(x) = w_{i-2}(x) - \left[\frac{r_{i-2}(x)}{r_{i-1}(x)}\right]_0^\infty w_{i-1}(x), \quad (5)$$

and $$r_i(x) = r_{i-2}(x) - \left[\frac{r_{i-2}(x)}{r_{i-1}(x)}\right]_0^\infty r_{i-1}(x). \quad (6)$$

The [] notation in the above equations denotes polynomial functions which are related in the following manner: for an independent variable z and a polynomial function of z, f(z), the expression $$[f(z)]_\alpha^\beta \quad (7)$$

denotes the polynomial function, $g(z)$, where $g(z)$ is defined as having the same coefficients as $f(z)$ for powers from $z^\alpha$ to $z^\beta$, and coefficients of zero for all other powers of z. For example, the [] notation in Equations 5 and 6, where the range of coefficients is from zero to positive infinity, denotes the nonnegative integer powers of x in the function $r_{i-2}(x)/r_{i-1}(x)$. Thus, the above-described Euclid's algorithm repeatedly divides a remainder by a quotient to arrive at a remainder, where at each step, the remainder is a polynomial of lower degree than the previous remainder, until $r_i(x) = 1$. When $r_i(x) = 1$, $w_i(x) = 1/b(x)$, or $w(x)$.

After producing $w(x)$, the circuit must then provide $w(x)$ to a multiplier circuit. For example, if $a(x)$ is to be divided by $b(x)$ to find quotient $c(x)$, $w(x)$ and $a(x)$ are provided to the inputs of a multiplier circuit to arrive at $c(x)$, since $c(x) = a(x)/b(x)$ mod $p(x)$ implies $c(x) = a(x) * w(x)$ mod $p(x)$. Since $c(x)$ is also an element of $GF(q^m)$, an implied modulo $p(x)$ operation is provided as part of the multiplier.

Finite field manipulation circuits are often used in communications systems where a continuous stream of data is supplied as an input. Finite field manipulation circuits may also be used in encryption subsystems, which are also often used in communications systems. Because of the continuous stream of data, each finite field manipulation circuit must be dedicated to a single operation, or else a delay is introduced by any multiple purpose circuits as they perform their many functions serially. Due to the many manipulations on the signal, such as inversion, multiplication, decoding and the like, and particularly where data encryption is involved, the amount of circuitry is large, and any means to eliminate operations, especially in an integrated circuit where space for circuitry is always a concern, will make designs of systems simpler, faster, less expensive and thus more attractive to use than other alternatives.

SUMMARY OF THE INVENTION

According to the invention, an apparatus and method are provided for simplifying a finite field division, including inputs for the initial condition signals $a(x)$, $b(x)$, and $p(x)$, and providing at an output node the signal $c(x)$, where $c(x) = a(x)/b(x)$ without intermediate multiplier circuitry. A reference register is initialized to $b(x)$, and a divider register is initialized to $a(x)$. Both registers are manipulated in parallel by a logic circuit which responds to the contents of the reference register, converting its contents to 1. By applying the same manipulations to the divider register, its contents are converted from $a(x)$ to $a(x)/b(x)$.

One embodiment of a finite field divider according to the present invention is used to provide a single finite field division of a single set of values $a(x)$, $b(x)$ and $p(x)$.

Another embodiment processes continuous streams of a(x), b(x) and p(x) values, to provide a continuous stream of c(x) values delayed by a calculation time. In yet another embodiment, p(x) is not a stream of values, but a constant either applied to the p(x) input of the finite field divider circuit or a constant defined by fixed circuit elements within the divider circuit.

A key operation according to the invention is manipulating contents of said storage locations of input data according to Euclid's algorithm which has been modified such that operations of Euclid's algorithm are reduced modulo the primitive polynomial and recursion on Euclid's algorithm occurs on a dividend element, the dividend element being one of the initial conditions, and the first divider location contents being reduced to the quotient element upon completion of the modified Euclid's algorithm.

The present invention provides an apparatus and method for simplifying finite field division by using an inverter with different initial conditions and by modifying shift operations in the inverter. In this way, a circuit implementing the present invention can be built using little more space on an integrated circuit than a simple finite field inverter. The invention will be better understood upon reference to the following detailed description in connection with the accompanying drawings.

BRIEF DESCRIPTION OF THE DRAWINGS

FIG. 4 is a table showing the outputs of the state machine shown in FIG. 1, in each state.

FIG. 5 is a table showing the state transitions of the state machine shown in FIG. 1.

FIG. 6 is a table showing the logic of the logic and control circuit shown in FIG. 1.

DESCRIPTION OF SPECIFIC EMBODIMENTS

Figure 1:
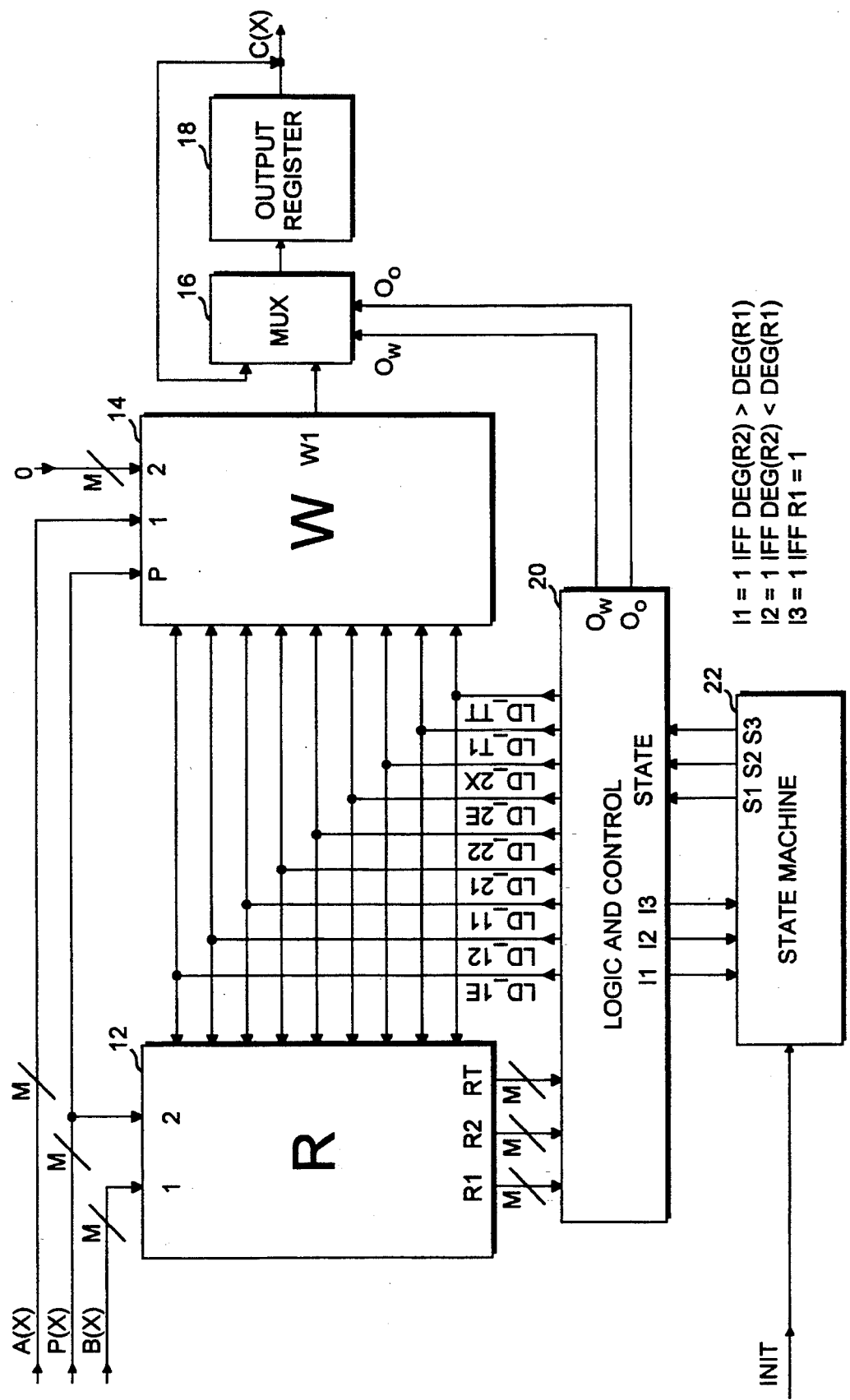
FIG. 1 is a block diagram of a finite field divider circuit for dividing one element by another in the Galois field $GF(2^m)$.
Figure 2:
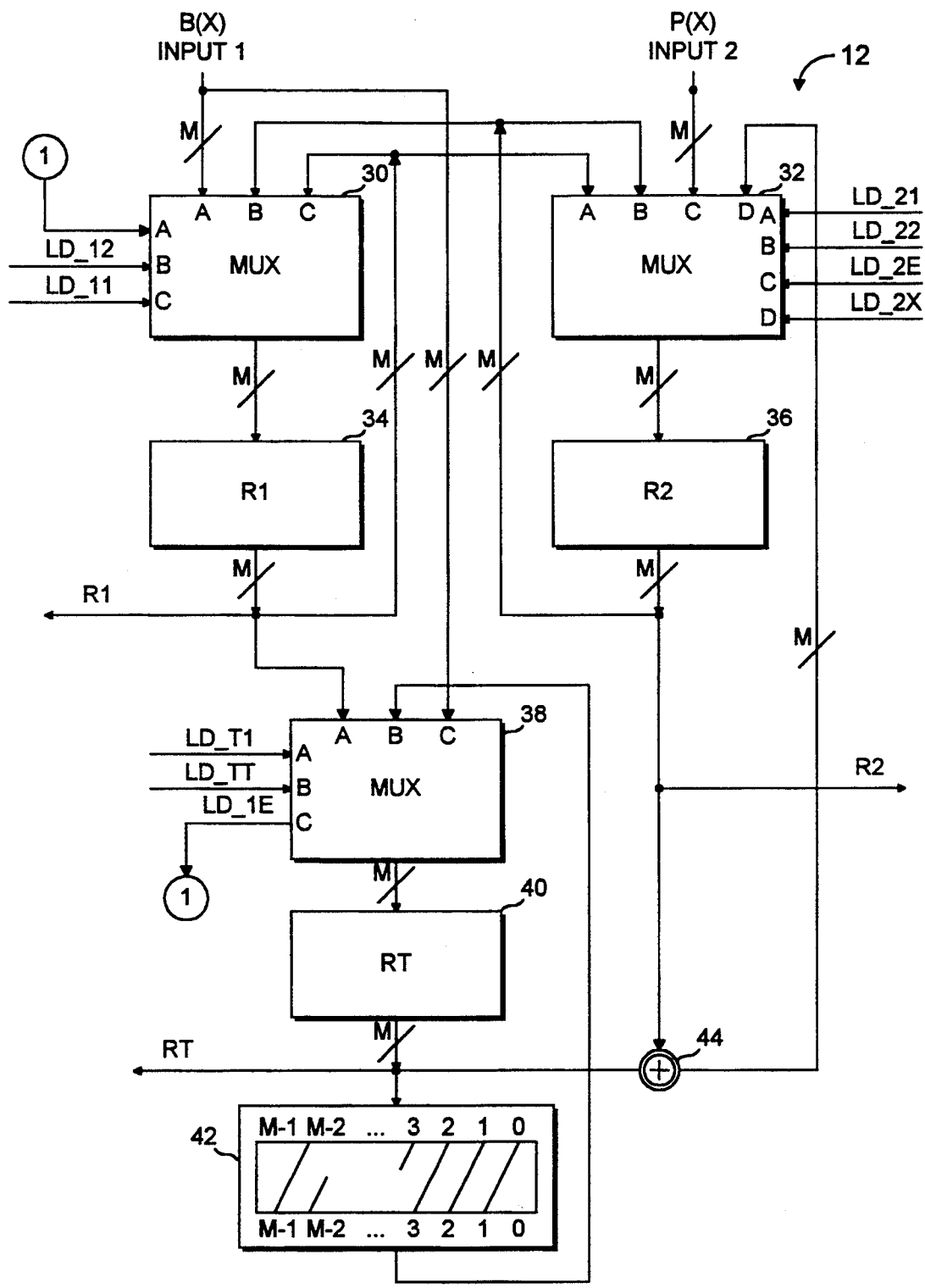
FIG. 2 is a more detailed block diagram of the R circuit shown in FIG. 1.
Figure 3:
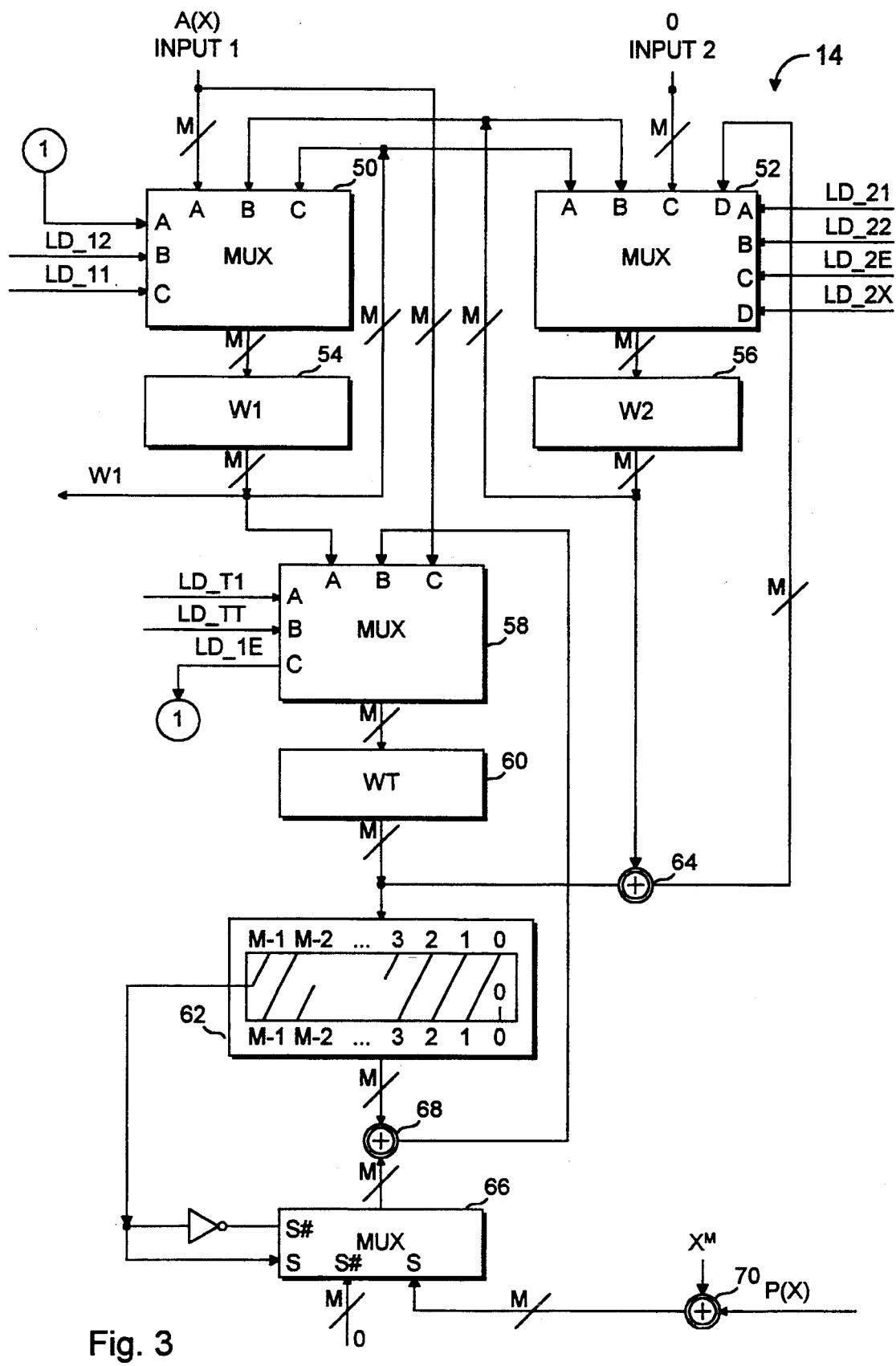
FIG. 3 is a more detailed block diagram of the W circuit shown in FIG. 1.

FIG. 1 shows a particular embodiment of a finite field divider circuit 10 according to the present invention. Finite field divider circuit 10 includes R circuit 12, W circuit 14, multiplexer 16, output register 18, logic and control circuit 20, and state machine 22. The internal operation of R circuit 12, which processes inputs based in control signals to form outputs, is shown in FIG. 2. The internal operation of W circuit 14, which also processes inputs based on the same control signals to form an output, is shown in FIG. 3. The operation of logic and control circuit 20 and state machine 22 are described in more detail in connection with FIGS. 4, 5 and 6. Where appropriate, signals are clocked to avoid race conditions, but for clarity the standard timing circuits are not shown.

The function of finite field divider circuit 10 is to provide a signal c(x), which is the finite field division of a(x)/b(x) in the finite field with a primitive polynomial p(x). The finite field is denoted as $GF(q^m)$, and a(x) and b(x) are elements in $GF(q^m)$, where $b(x) \neq 0$, $$p(x) = p_0 + p_1 x + \ldots + p_m x^m, \quad (8)$$

$$b(x) = b_0 + \ldots + b_{m-1} x^{m-1}, \quad (9)$$

$$a(x) a_0 + \ldots + a_{m-1} x^{m-1}, \quad (10)$$

and where $\{a_i\}$ and $\{b_i\}$ are elements of the base field $GF(q)$. Finite field divider circuit 10 performs the following recursive manipulations of input data a(x) and b(x) to produce an output c(x), where c(x)=a(x)/b(x), the recursion being defined by the following steps:

Step 0: (initial conditions)

$$c_{-1}(x) = 0,\ c_0(x) = a(x),\ r_{-1}(x) = p(x),\ r_0(x) = b(x) \quad (11)$$

Step i, for i>0:

$$c_i(x) = \left( c_{i-2}(x) - \left[ \frac{r_{i-2}(x)}{r_{i-1}(x)} \right]_0^\infty c_{i-1}(x) \right) \bmod p(x), \quad (12)$$

and $$r_i(x) = r_{i-2}(x) - \left[ \frac{r_{i-2}(x)}{r_{i-1}(x)} \right]_0^\infty r_{i-1}(x). \quad (13)$$

The recursion continues until $r_i(x) = 1$, at which point $c_i(x)$ is output as c(x).

The components of finite field divider circuit 10 will now be described. The particular embodiment shown is for q=2, however the expansion of circuit 10 for q greater than 2 is straightforward. In $GF(2^m)$, any element can be represented by a binary vector of length m. Thus, adding or subtracting two elements in $GF(2^m)$ is merely equivalent to a component-by-component XOR operation of the two binary vectors representing the two elements. This fact is used throughout the implementation of the preferred embodiment.

As shown in FIG. 1, R circuit 12 has two m-bit inputs to receive digital signals representing b(x) and p(x), and nine one-bit control inputs. R circuit 12 also has three m-bit outputs to output the contents of internal registers (see FIG. 2). The W circuit 14 has three m-bit inputs to receive p(x), a(x), and an m-bit zero signal. The W circuit 14 also receives the same nine one-bit control signals and outputs the contents of one internal m-bit register. The function of the nine one-bit control signals are apparent from FIGS. 2 and 3 and the accompanying description. The R circuit 12 and the W circuit 14 manipulate the a(x), b(x), and p(x) such that c(x) is present at the W1 output of W circuit 14 when the R1 output of R circuit 12 is equal to one. When the R1 output is one, logic and control circuit 20 asserts its $O_w$ output ($O_w$ = LOGICAL 1 or TRUE) and multiplexer 16 passes c(x) from the W1 output to output register 18. Once c(x) is passed to output register 18, logic and control circuit 20 asserts $O_o$ ($O_o = 1$), which causes the output of output register 18, c(x), to be the input to output register 18, effectively holding c(x) at the output. As is explained below in connection with FIGS. 5 and 6, $O_o$ remains asserted until the INIT signal into state machine 22 is asserted. It is to be understood that in the context of logical operations described herein, a "high" or "one" is a logical TRUE value and a "low" or a "zero" is a logical FALSE value, as is conventionally understood in the art.

Logic and control circuit 20 provides three inputs, $I_1$, $I_2$, and $I_3$ to state machine 22. From these three inputs and the INIT input and the current state of state machine 22, state machine 22 determines a new state. The new state is output on output lines $S_1$, $S_2$ and $S_3$, after a clock cycle. Logic and control circuit 20 also uses $I_{1-3}$ internally to modify control signals which are provided to R circuit 12 and W circuit 14 (See FIG. 5 and accompanying text).

FIG. 2 shows in greater detail the circuitry of R circuit 12. R circuit 12 includes a multiplexer 30 with three inputs, a multiplexer 32 with four inputs, a register R1 34, a register R2 36, a multiplexer 38 with three inputs, a register RT 40, a shifter 42, and an m-bit exclusive OR (XOR) gate 44. M-bit XOR gate 44 has two inputs which accept two m-bit values and one output which outputs an m-bit result of a bitwise XOR of the bits of the two inputs. Multiplexers 30, 32 and 38 control the contents of registers R1, R2 and RT, respectively, in response to the input control signals. The input signals are provided by logic and control circuit 20.

Multiplexer 30 loads R1 with either the contents of R1 (i.e. no change), the contents of R2, or the signal present at input 1. Multiplexer 32 loads R2 with either the contents of R2, the contents of R1, the signal present at input 2, or the output of m-bit XOR gate 44. Shifter 42 shifts the contents of RT by one bit to the left and appends a zero on the right, effectively multiplying the contents of RT by x. M-bit XOR gate 44 effectively subtracts, in $GF(2^m)$, the contents of RT from the contents of R2.

FIG. 3 shows in greater detail the circuitry of the W circuit 14. The W circuit 14 includes a multiplexer 50 with three inputs, a multiplexer 52 with four inputs, a register W1 54, a register W2 56, a multiplexer 58 with three inputs, a register WT 60, a shifter 62, an m-bit XOR gate 64, multiplexer 66, an m-bit XOR gate 68 and an m-bit XOR gate 70. Multiplexers 50, 52 and 58 control the contents of registers W1, W2 and WT, respectively, in response to the input control signals. The input signals are provided by logic and control circuit 20.

Multiplexer 50 loads W1 with either the contents of W1, the contents of W2, or the signal present at input 1. Multiplexer 52 loads W2 with either the contents of W2, the contents of W1, the signal present at input 2, which is zero, or the output of m-bit XOR gate 64. Shifter 62 shifts the contents of WT by one bit to the left and appends a zero on the right, effectively multiplying the contents of WT by x.

By contrast with shifter 42 in R circuit 12, in W circuit 14 the multiplication of the contents of WT is done modulo p(x). In the field $GF(2^m)$, the operation $x*f(x) \mod [p(x)]$ is equivalent to shifting f(x) by one bit and XORing the shifted f(x) with $(p(x)-x^m)$ whenever the $x^{m-1}$ coefficient of f(x) is nonzero. For finite fields with q>2, the shifting is the same, but $(p(x)-x^m)$ is subtracted from the shifted f(x) instead of XORed. When shifter 62 overflows, a selection signal on multiplexer 66 is asserted and $(p(x)-x^m)$ is applied to a first input of m-bit XOR gate 68. If the selection signal is not asserted, an m-bit zero signal is applied to the first input of m-bit XOR gate 68. The second input to m-bit XOR gate 68 receives the output of shifter 62. The output of m-bit XOR gate 68 is coupled to one input of multiplexer 58. M-bit XOR gate 70 provides the signal $(p(x)-x^m)$ to multiplexer 66. M-bit XOR gate 64 subtracts the contents of WT from the contents of W2, and provides the result of the subtraction to multiplexer 52.

FIG. 4 shows the relationship between the various states of state machine 22 and the state machine bit outputs. Using the three state machine bit outputs, state machine 22 communicates the current state to logic and control circuit 20. As should be apparent from FIG. 1, the particular values shown in FIG. 4 are but one set of values, and other sets of values will work equally well.

FIG. 5 shows the relationship between the current state of state machine 22, the inputs to state machine 22, and the new state of state machine 22 at the next clock cycle. To avoid race conditions, the state of state machine 22 is changed only every clock period, the new state determined from the old state and the input values at the beginning of the clock period. The input values are determined by the polynomials stored in R1, R2, and RT. $I_1$ is 1 when the degree of the polynomial in R2 is greater than the polynomial in RT, otherwise $I_1$ is zero. $I_2$ is 1 when the degree of the polynomial in R2 is less than the polynomial in R1, otherwise $I_2$ is 0. $I_3$ is 1 when the polynomial in R1 is equal to 1, otherwise $I_3$ is equal to zero.

In normal operation, a 1 at the INIT input will cause a transition to the RESET state, where state machine 22 remains until the INIT signal is equal to 0. One clock cycle after the transition of INIT from 1 to 0, state machine 22 moves from the RESET state to the CALC0 state. State machine 22 remains in the CALC0 state until $I_1=0$. At the next clock transition after $I_1=0$, state machine 22 moves to the CALC1 state.

State machine 22 is in the CALC1 state for only one clock cycle. At the next clock transition, if $I_2=1$, then state machine 22 moves to the CHKRES state, otherwise if $I_2=0$, state machine 22 moves back to the CALC0 state. State machine 22 is also in the CHKRES state for only one clock cycle. At the next clock transition while in the CHKRES state, state machine 22 moves back to the CALC0 state if $I_3=0$ and moves to the HOLD state if $I_3=1$. Once in the HOLD state, state machine 22 remains there until INIT=1. As shown in FIG. 5, anytime the INIT signal goes high (INIT=1), state machine 22 moves to the RESET state.

FIG. 6 will be described in conjunction with FIG. 7, a flow diagram of the operation of finite field divider circuit 10 in $GF(2^m)$. FIG. 6 is a table showing the outputs of logic and control circuit 20 for each combination of state inputs and R circuit 12 inputs to logic and control circuit 20. The outputs of logic and control circuit 20 implement the functionality shown in the flow diagram of FIG. 7.

Figure 7:
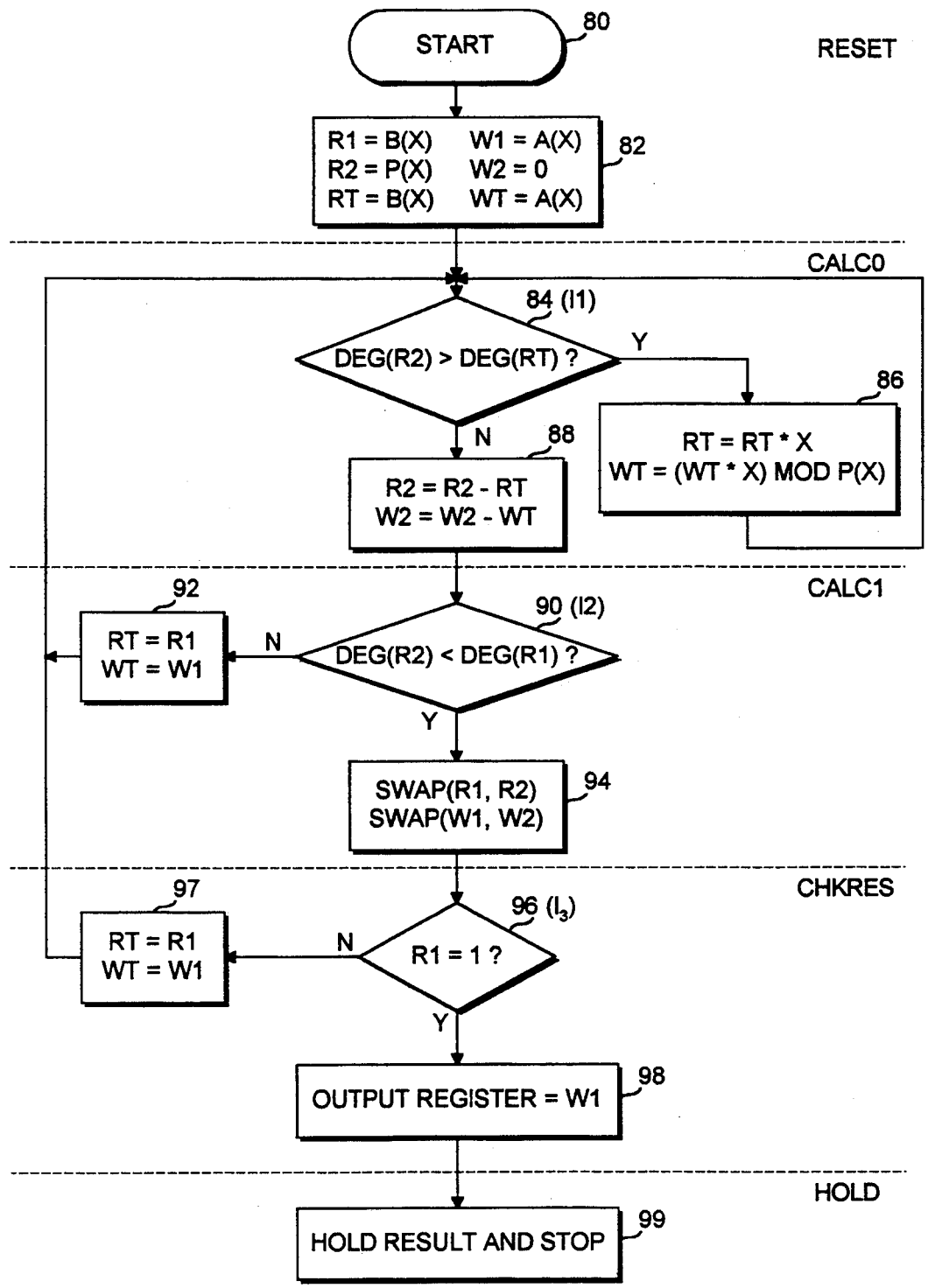
FIG. 7 is a flow diagram showing the operation of the finite field divider shown in FIG. 1.

The flow described in FIG. 7 is a modified Euclid's algorithm. The modification is that the dividend element is used as an initial condition in place of the value one for $w_0(x)$ shown in connection with Equation 4 above, and manipulations are performed modulo p(x). Flow starts at block 80 when the INIT signal goes TRUE or high (set to 1), then FALSE or low (reset to 0). At the next clock transition marking the end of a clock period, state machine 22 goes into the CALC0 state. The current state of state machine 22 is broadly delimited in FIG. 7, to illustrate the flow in each of the states of state machine 22.

At block 82, signals LD_1E and LD_2E are asserted, thereby loading external signal b(x) into R1 and RT, external signal a(x) into W1 and WT, external signal p(x) into R2, and 0 into W2. The flow passes to block 84 and the state changes to CALC0.

At block 84, the degree of the polynomial in R2 is compared with the degree of the polynomial in RT, to determine $I_1$. If the degree of R2 is greater than the degree of RT, i.e. $I_1=1$, the flow passes to block 86, otherwise the flow passes to block 88.

At block 86, signals LD_11, LD_22, and LD_TT are asserted, thereby loading R1, R2, W1 and W2 into themselves, and multiplying RT and WT by x, increasing the degrees of RT and WT by one. Following the rules of finite fields, a multiplication overflow is prevented by a modulo p(x) operation on the result of the multiplication. The modulo operation is not performed on RT because a multiplication by x will never cause an overflow of RT, since the degree of RT is always less than R2 at block 86, and R2 contains an element of the finite field. Thus RT*x will never have a degree larger than an element of the finite field. The multiplication by x is performed by shifting the contents of RT and WT by one position as shown in FIGS. 2 and 3. The flow between block 86 to block 84 continues until the degree of RT is equal to the degree of R2 ($I_1=0$), at which point the flow proceeds to block 88.

At block 88, LD_11 and LD_2X are asserted, thereby loading R1 and W1 into themselves, subtracting RT from R2 and subtracting WT from W2. The state changes to CALC1, and the flow passes to block 90.

At block 90, the degree of the polynomial in R2 is compared with the degree of the polynomial in R1, to determine $I_2$. If the degree of R2 is not less than the degree of R1, i.e. $I_2=0$, the flow passes to block 92, otherwise the flow passes to block 94.

At block 92, signals LD_11, LD_22, and LD_T1 are asserted, thereby loading R1, R2, W1 and W2 into themselves, loading R1 into RT and loading W1 into WT. The state changes back to CALC0, and the flow passes back to block 84. Since RT and R2 normally have the same degree at block 88, subtracting RT from R2 reduced the degree of R2, and therefore must eventually reduce the degree of R2 below the degree of R1, which was the initial value for RT. The flow loops through blocks 84, 86, 88, 90, and 92 until R2 does reduce in degree to less than R1. At that point, the flow passes from block 90 to block 94.

At block 94, LD_12 and LD_21 are asserted, thereby swapping the contents of R1 and R2 with each other and swapping the contents of W1 and W2 with each other. From block 94, the state changes to CHKRES and the flow passes to block 96. When the flow passes to block 94, one step of the recursion of Equations 12 and 13 is completed. The results of the step of the recursion are contained in R2 and W2.

At block 96, now in the CHKRES state, R1 is compared with 1. If the polynomial stored in R1 is not equal to 1, i.e., $I_3=0$, the flow passes to block 97.

At block 97, signals LD_11, LD_22, and LD_T1 are asserted, thereby loading R1, R2, W1 and W2 into themselves, loading R1 into RT and loading W1 into WT. The state changes back to CALC0, and the flow passes back to block 84.

However, at block 96, if R1 is equal to 1, i.e. $I_3=1$, then the result of the division of a(x) by b(x) is stored in W1, and the flow passes to block 98. According to Euclid's algorithm, which has been detailed above, R1 must eventually equal 1 unless b(x), the initial value for R1 and RT, is zero. If b(x)=0, then state machine 22 would never leave the CALC0 state since RT would always be zero and therefore $I_1$ would always be 1. However, this case is not a problem, because the result sought by finite field divider circuit 10 is a(x)/b(x), and thus the operation would be a division by zero, and the zero element has no inverse in finite fields.

At block 98, the $O_w$ signal is asserted, thereby loading W1, containing the result of the division, or c(x), into output register 18. The state changes to HOLD, and the flow passes to block 99.

At block 99, in the HOLD state, $O_o$ is asserted, causing the output of W1, c(x), to persist in output register 18 and therefore the output of finite field divider circuit 10. The output of finite field divider circuit 10 remains constant, the flow remains at block 99, and state machine 22 remains in the HOLD state, until the INIT signal is again asserted. In this way, one input signal is divided by another in an efficient manner.

Figure 8:
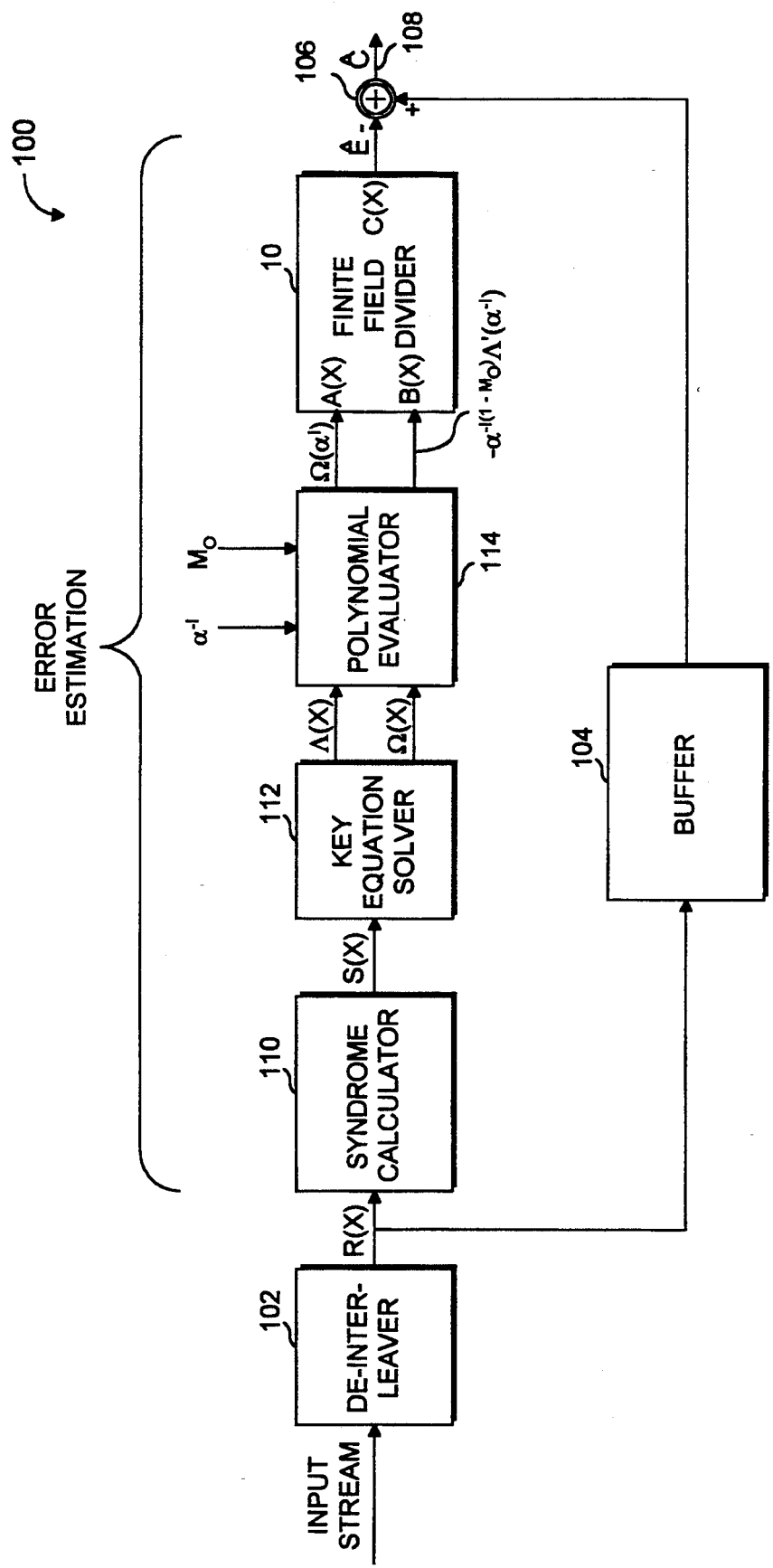
FIG. 8 is a block diagram of an algebraic decoder according to the present invention.

FIG. 8 is a block diagram of an algebraic decoder 100 according to the present invention. Algebraic decoder 100 is part of an error-correcting communication system and converts a received word, r(x), into an estimated code word, ĉ(x), which is an estimate of a transmitted code word, c(x), before being subject to noise in a communications channel.

In a typical communication system, code words are interleaved, to minimize the damage to a single code word caused by a burst of errors. A deinterleaver 102 is coupled to a received data stream, and deinterleaver 102 extracts a received word, r(x), from the received data stream for processing by algebraic decoder 100. Algebraic decoder 100 operates by producing an estimated error word, ê(x), buffering r(x) in a buffer 104 to account for the delay in error word estimation, and subtracting ê(x) from r(x) using an adder 106 to form ĉ(x) on an output bus 108. If the words are members of a binary code, subtraction and addition are identical, so ê(x) just as well be added to r(x) instead of subtracted, when q=2.

The process of generating ê(x) from r(x) will now be described. The output of interleaver 102, r(x), is coupled to the input of a syndrome calculator 110. A syndrome polynomial, S(x), is output by syndrome calculator 110, and the coefficients of S(x) are determined from the following expression:

$$S_j = \sum_{i=0}^{n-1} r_i \alpha^{i(m_0+j)}, \tag{14}$$

where n is the length of the code, $r_i$ is the $i^{th}$ coefficient of r(x), and $\alpha$ is an element of $GF(q^m)$. For simplicity, $m_0$ is set to zero; however, other values are possible, such as $m_0=1$ for Reed-Solomon codes. At the input of syndrome calculator 110, r(x) is equivalent to e(x), the actual error word, since algebraic decoder 100 is a linear system, and the syndrome of c(x), the difference between e(x) and r(x), is zero, and since c(x) is a valid code word.

Once S(x) is calculated by syndrome calculator 110, S(x) is applied to an input of a key equation solver 112, which finds an error-locator polynomial, $\Lambda(x)$, and an error-evaluator polynomial, $\Omega(x)$, which satisfy the relation:

$$\Lambda(x)S(x) \equiv \Omega(x) \bmod x^{2t} \tag{15}$$

where t is the number of errors correctable by the code used to transmit c(x). This relation is known as the key equation. One method for solving the key equation is shown in Clark, G. C., and Cain, J. B., *Error-Correction Coding for Digital Communications*, Plenum Press 1981, pp. 195–201.

When the key equation is solved, the solutions, $\Lambda(x)$ and $\Omega(x)$, are evaluated by a polynomial evaluator 114 at the first n powers of $\alpha^{-1}$. Polynomial evaluator 114 also performs a multiplication and takes a derivative of $\Lambda(x)$ at the inverse power of $\alpha$, and outputs, for each i, the values $$\Omega(\alpha^{-i}) \text{ and } -\alpha^{i(1-m0)}\Lambda/\alpha^{-i} \qquad (16)$$

when $\Lambda(x)$ is zero, otherwise 0 is output in place of $\Omega(x)$. Consequently, $\Lambda(x)$ indicates the position of any errors, and if and when errors exist, the value of the errors are computed using Equation 17. In the above expression, $\Lambda'(x)$ is the derivative of $\Lambda(x)$ with respect to x.

The position of each error and its value can be determined from corresponding evaluations of $\Lambda'(x)$ and $\Omega(x)$, using the equations $$\hat{e}_i = \frac{\Omega(\alpha^{-i})}{-\alpha^{i(1-m0)}\Lambda'(\alpha^{-i})}, \text{ when } \Lambda(\alpha^{-i}) = 0, \text{ and} \qquad (17)$$

$$\hat{e}_i = 0, \text{ when } \Lambda(\alpha^{-i}) \neq 0. \qquad (18)$$

The numerator and the denominator on the right side of Equation 17, which are provided as finite field element outputs of polynomial evaluator 114, are divided by finite field divider 10. The set of estimates $\hat{e}_i$ form an error estimate word, $\hat{e}(x)$. At adder 106, the error estimate word is subtracted from the received word r(x) to form the estimated code word $\hat{c}(x)$.

Figure 9:
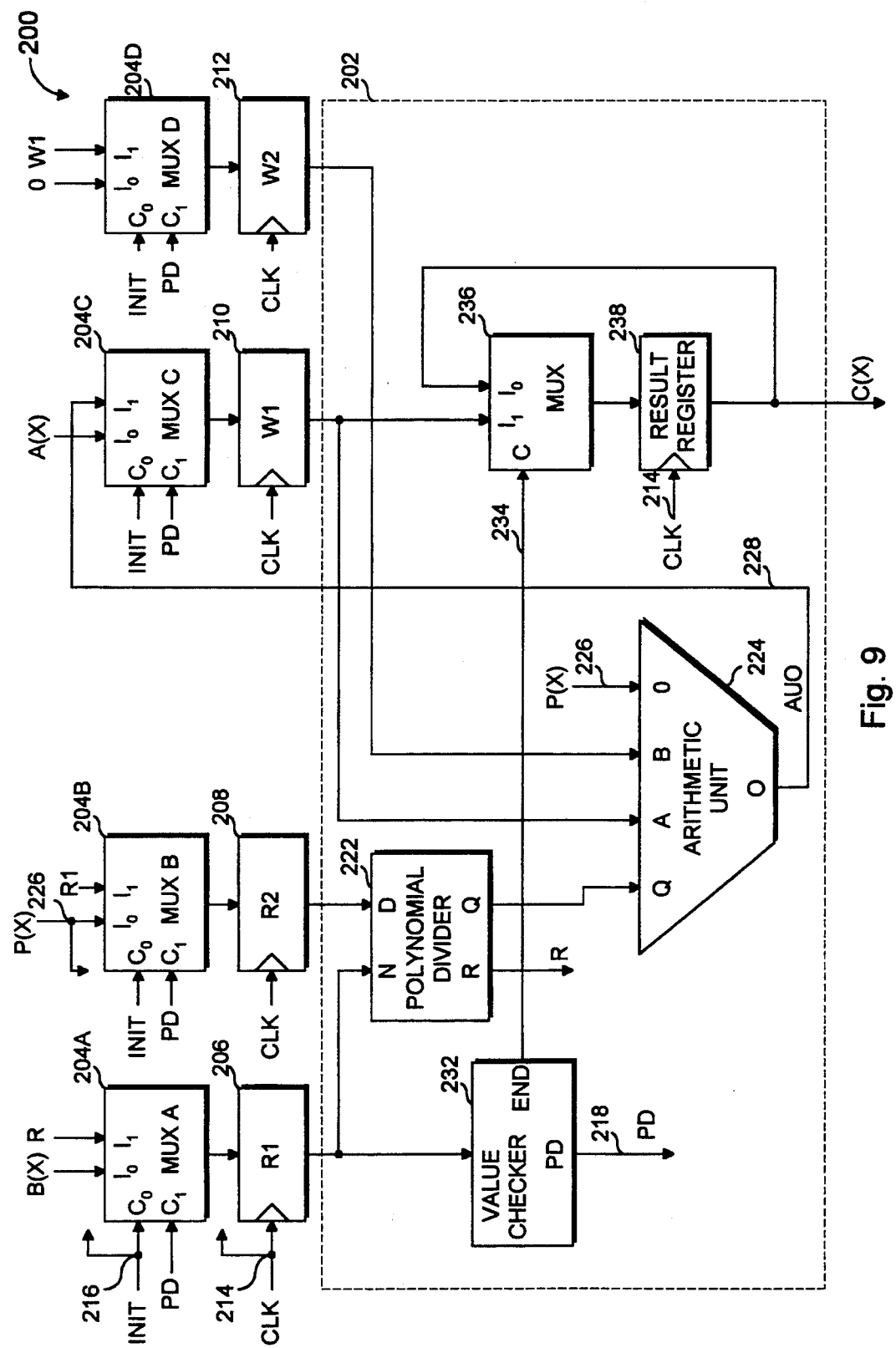
FIG. 9 is an alternate embodiment of the present invention using polynomial arithmetic circuits.

FIG. 9 shows an alternate embodiment of the present invention using polynomial arithmetic circuits. As shown in FIG. 9, four inputs of a finite field divider 200 are coupled to four respective multiplexers 204a–204d. Each multiplexer of multiplexers 204a–204d has two inputs, $I_0$ and $I_1$, one output, and two control lines, $C_0$ and $C_1$. When $C_O$ is asserted the output is equal to $I_0$, when $C_O$ is not asserted and $C_1$ is asserted, the output is equal to $I_1$, and when neither input is asserted, the output of the multiplexer is undefined.

Multiplexers 204a–204d are in turn coupled to four registers: reference register R1 206, reference register R2 208, divisor register W1 210, and divisor register W2 212. Reference registers R1 and R2 are coupled to a polynomial manipulator 202. Polynomial manipulator 202 outputs a finite field element c(x), which is the finite field division of the initial value a(x) by the initial value b(x) with the finite field division using the initial value p(x) as a primitive polynomial.

Registers R1, R2, W1, and W2 each have a clock input coupled to a clock line 214. A clock signal is input to finite field divider 200 to control the timing of the circuits therein. Accordingly, the contents of registers R1, R2, W1, and W2 are constrained to change only once each cycle of the clock signal, during a load time within the clock cycle.

The $C_O$ input of each multiplexer is coupled to an INIT signal line 216, which is an additional input to finite field divider 200, and the $C_1$ input of each multiplexer is coupled to a PD signal line 218, which carries a PD signal, the generation of which is discussed below. In operation, if the INIT signal is asserted on INIT signal line 216 during the load time of the clock cycle, multiplexer 204a loads b(x) into R1, multiplexer 204b loads p(x) into R2, multiplexer 204c loads a(x) into W1, and multiplexer 204d loads zero into W2.

The activity of the polynomial manipulator 202 in one clock cycle will now be described. A polynomial divider 222 is provided within polynomial manipulator 202, and has two inputs, a numerator input N coupled to the output of R1 and a denominator input D coupled to the output of R2. Polynomial divider 222 outputs the remainder and quotient of a polynomial division of the value at input N by the value at input D, at an R output and a Q output, respectively. The R output of polynomial divider 222 is coupled to the $I_1$ input of multiplexer 204a, and output Q of polynomial divider 222 is coupled to a Q input of a finite field arithmetic unit 224.

The other inputs to arithmetic unit 224 are as follows: the output of W1 is coupled to an A input, the output of W2 is coupled to a B input, and the primitive polynomial input line 226 applies p(x) to a P input. Arithmetic unit 224 outputs a value, AUO, on output line 228 which is related to the four arithmetic unit inputs Q, A, B, and P by the equation:

$$AUO = [B - (A*Q)] \bmod P,$$

where the necessary arithmetic operations are polynomial operations performed module p(x), the primitive polynomial input at input P. The internal operation of arithmetic unit 224 is discussed in connection with FIGS. 10a and 10b. The output of arithmetic unit 224 is coupled to the $I_1$ input of multiplexer 204c. Thus, as long as the PD signal on line 230 is asserted and the INIT signal is not asserted, multiplexer 204c loads the value at the arithmetic unit output into W1 during the load time of the clock cycle.

An input to a value checker 232 is coupled to the output of R1, and value checker 232 asserts one of two output signals depending on the value output by R1. A first signal, PD, is asserted if the value output by R1 is not equal to one, and a second signal, END, is asserted when the value output by R1 is equal to one. In other embodiments, END is asserted when the value output by R1 is a constant and PD is asserted when the value output by R1 is not a constant. The PD signal is output by value checker 232 on PD signal line 218.

As discussed above, if the PD signal is asserted on PD signal line 218 and the INIT signal is not asserted during the load time of the clock cycle, multiplexers 204a–204d load values at their $I_1$ inputs into registers R1, R2 W1, and W2, as follows: the value at the R output of polynomial divider 222 is loaded into R1, the value at the output of R1 is loaded into R2, the value at the output of arithmetic unit 224 is loaded into W1, and the valise at the output of W1 is loaded into W2. The processing of register contents continues until the PD signal is no longer asserted, indicating that R1 contains the value one, or in other embodiments, that R1 contains a constant polynomial value.

When R1 contains a constant or a one, the signal END is asserted by value checker on END signal line 234. A further multiplexer 236 with two inputs, $I_0$ and $I_1$, a control input C, and an output is provided in polynomial manipulator 202. Multiplexer 236 is such that when the END signal is not asserted, the value at the input $I_0$ is output, and when the END signal is asserted, the value at the input $I_1$ is output. The output of multiplexer 236 is coupled to an input of a result register 238, the $I_0$ input of multiplexer 236 is coupled to the output of result register 238, and the $I_1$ input of multiplexer 236 is coupled to the output of W1. Thus, when the END signal is not asserted during the load time of the clock cycle, the input to result register 238 is its own output, so it remains unchanged. However, when the END signal is asserted during the load time of the clock cycle, the input to result register 238 is the output of W1, and because of the particular connections selected in polynomial manipulator 202, when R1 contains a polynomial of degree zero or a constant, W1 and result register 238 contain c(x), the finite field element equal to the finite field division of a(x) by b(x) with the primitive polynomial p(x).

Figure 10A:
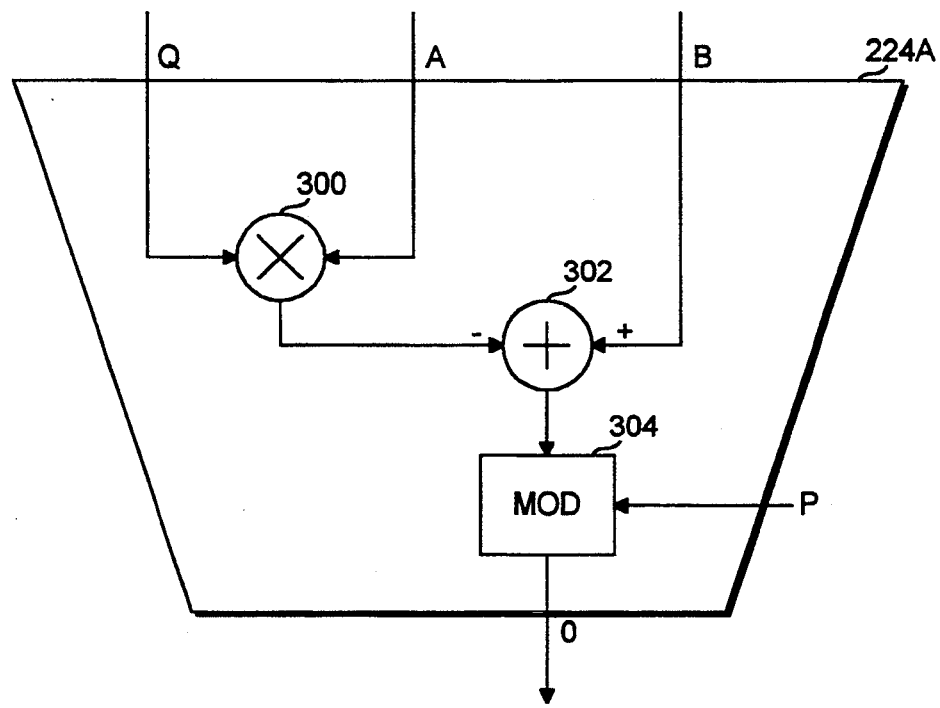
FIG. 10A and FIG. 10B show two embodiments of a finite field arithmetic unit.
Figure 10B:
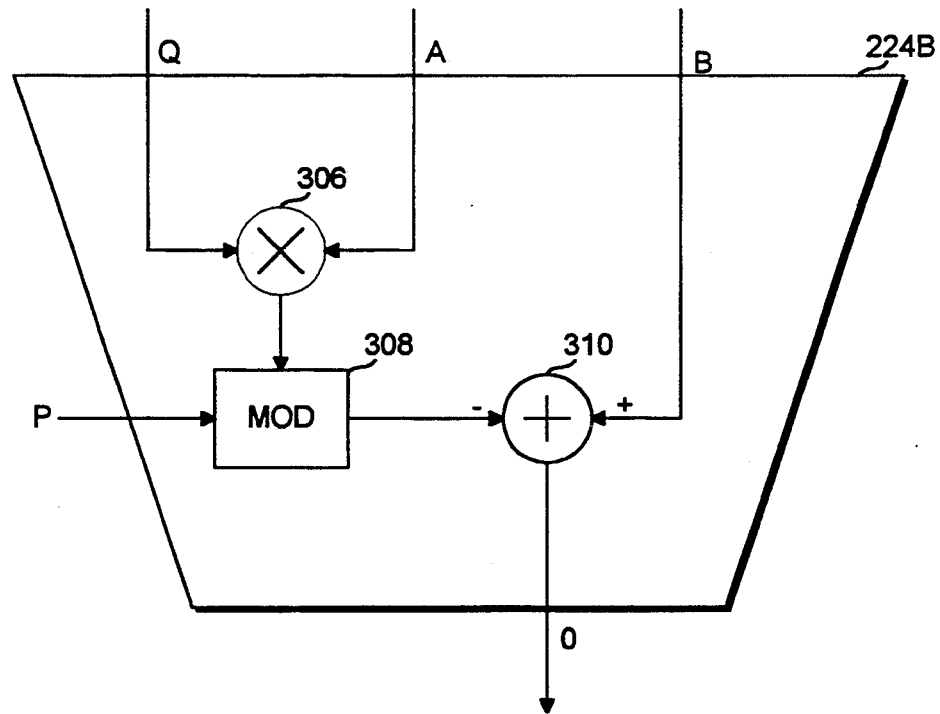

FIGS. 10A and 10B are alternate embodiments of arithmetic unit 224. In one arithmetic unit 224A, shown in FIG. 10A, a multiplier 300 multiplies the values input at the Q input and the A input, and a differential adder 302 subtracts the output of multiplier 300 from the value input at the B input. Modulo reducer 304 then reduces the output of adder 302 by a primitive polynomial input at the P input, and outputs the modulo reducer 304 output as the arithmetic unit output.

In a second arithmetic unit 224B, shown in FIG. 10B, a multiplier 306 multiplies the values input at the Q input and the A input, and a modulo reducer 308 reduces the output of multiplier 306 by a primitive polynomial input at the P input. Differential adder 302 subtracts the output of modulo reducer 308 from the value input at the B input, and outputs the difference as output O. Because the operations performed by arithmetic unit 224 are distributive, the outputs of arithmetic units 224A and 224B are the same for a given set of Q, A, B, and P inputs.

Figure 11A:
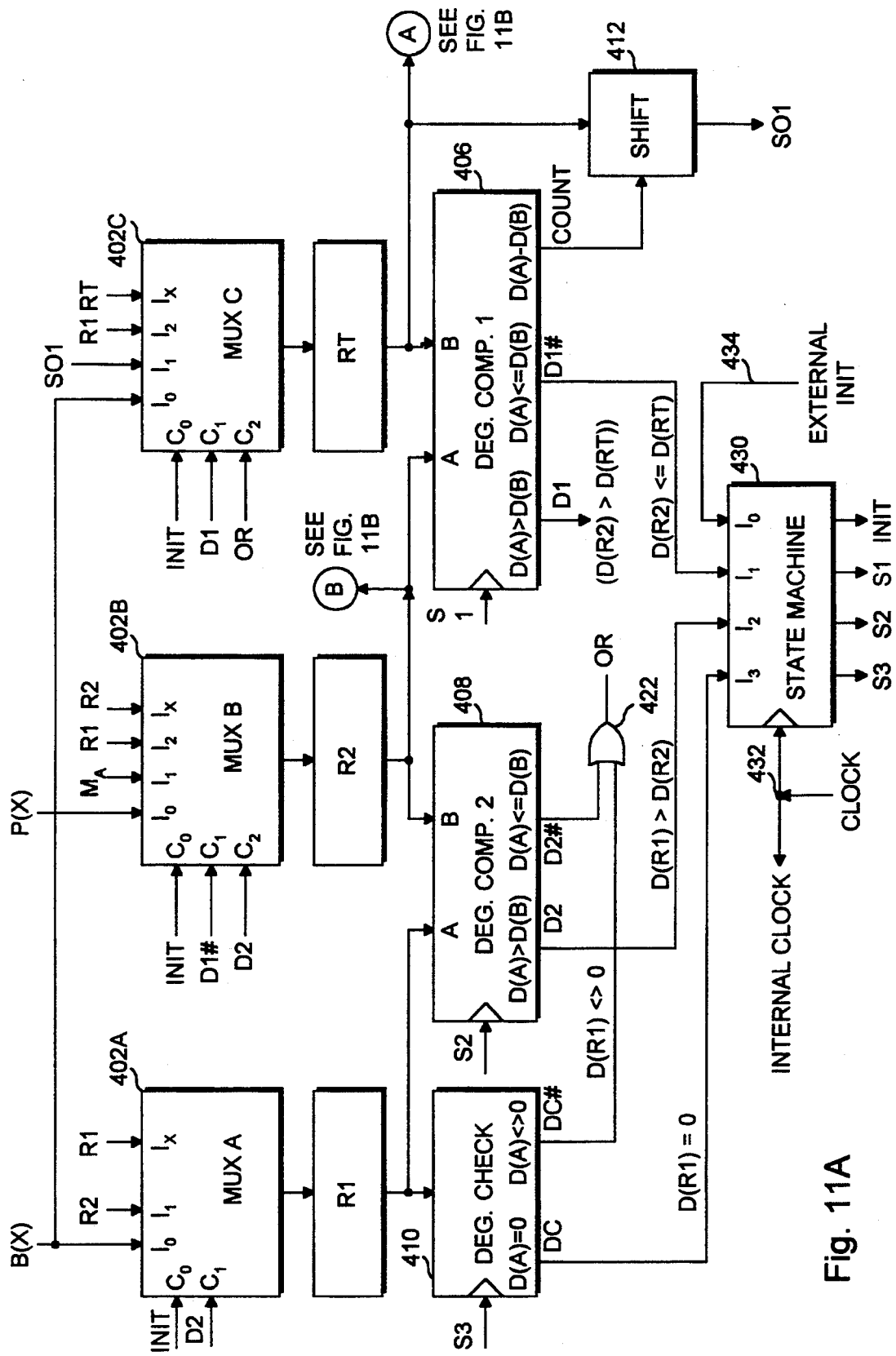
FIG. 11 is an alternate embodiment of the present invention using temporary storage locations.
Figure 11B:
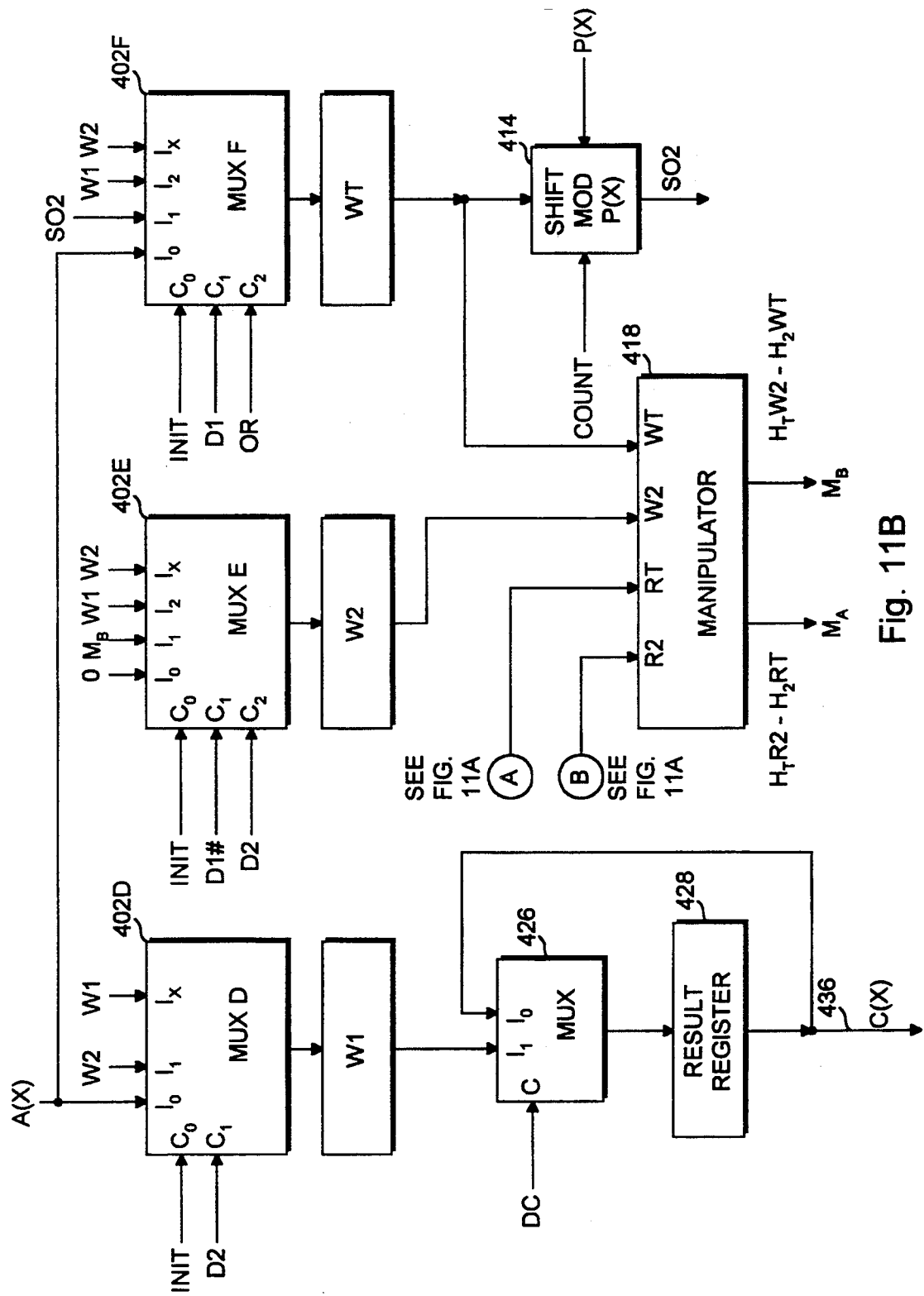

FIG. 11 shows an alternate embodiment of the present invention using temporary storage locations for division in finite fields with a characteristic, q, of two or more. As shown in FIG. 11, the interface to finite field divider 400 includes three polynomial value inputs, an external INIT signal input, a clock signal input, and a result output. Internally, finite field divider 400 includes six multiplexers 402a–402f, six registers R1, R2, RT, W1, W2, and WT, a degree comparator 406, a degree comparator 408, a degree checker 410, a polynomial shifter 412, a second polynomial shifter 414, a manipulator 418, an OR gate 422, a two-input multiplexer 426, a result register 428 and a state machine 430. The operation of these elements shown in FIG. 11 are described below, followed by a description of the operation and interaction of the elements.

The six multiplexers 402a–402f operate as follows. Each multiplexer has an output coupled to a respective register as shown in FIG. 11. At each clock cycle, the multiplexers output one of their input values $I_{0-2}$ and $I_x$, where the particular input value output depends on signals asserted at control inputs $C_{0-2}$. If a control signal is asserted, a corresponding input is output unless a lower numbered control input is also asserted, and when no control inputs are asserted, $I_x$ is output.

For example, if $C_1$ is asserted and $C_0$ is not asserted in a multiplexer, the $I_1$ value input of that multiplexer is output by that multiplexer. However, if the $C_0$ control input were asserted, the $I_0$ value would be output, regardless of any signal on $C_1$. Typically, a signal is not asserted on a line when the line carries a logical FALSE, or 0, and a signal is asserted on a line when the line carries a logical TRUE, or 1, however the embodiment shown in FIG. 11 is implementable with other combinations of logic. Multiplexers 402a and 402d have only two control inputs and three value inputs, while multiplexers 402b, 402c, 402e, and 402f have three control inputs and four value inputs. The value inputs to the multiplexers are generally in the form of polynomial elements of a finite field or primitive polynomials for the finite field.

Degree comparator 406 outputs three signals in response to an enabling clock, which in this case is a signal S1. The first output is a logical signal which is asserted when the degree of a polynomial at an A input of degree comparator 406 is greater than the degree of a polynomial at a B input of degree comparator 406. A second output is a logical signal which is asserted when the degree of the polynomial at the A input of degree comparator 406 is less than or equal to the degree of the polynomial at the B input of degree comparator 406, although in practice, the degree of the polynomial at the A input is not less than the degree of the polynomial at the B input. The third output, COUNT, is a difference value indicating the difference in degrees between the polynomial at the A input and the polynomial at the B input. When the enabling clock is not asserted, no outputs of degree comparator 406 are asserted. Thus, degree comparator 406 is effectively inactive unless the S1 signal is asserted.

Degree comparator 408 outputs two signals in response to an enabling clock, which in this case is a signal S2. The first output is a logical signal which is asserted when the degree of a polynomial at an A input of degree comparator 408 is greater than the degree of a polynomial at a B input of degree comparator 408. A second output is a logical signal which is asserted when the degree of the polynomial at the A input of degree comparator 408 is less than or equal to the degree of the polynomial at the B input of degree comparator 408. When the enabling clock is not asserted, no outputs of degree comparator 408 are asserted. Thus, degree comparator 408 is effectively inactive unless the S2 signal is asserted.

Degree checker 410 outputs two signals in response to an enabling clock, which in this case is a signal S3. The first output is a logical signal which is asserted when the degree of a polynomial at the input of degree checker 410 is zero. A second output is a logical signal which is asserted when the degree of the polynomial at the input of degree checker 410 is not zero. Since finite field polynomials have degrees of zero or greater, an asserted second input indicates that the polynomial at the input to degree checker 410 is of degree greater than zero. When the enabling clock is not asserted, no outputs of degree checker 410 are asserted. Thus, degree checker 410 is effectively inactive unless the S3 signal is asserted.

Polynomial shifter 412 outputs a polynomial equal to its input shifted by a number of degrees indicated by a shift input. Polynomial shifter 414 outputs a polynomial equal to its input shifted by a number of degrees indicated by a shift input, where overflows beyond the range of a finite field element are reduced modulo the primitive polynomial provided at a MOD input. Polynomial shifter 414 is similar to polynomial shifter 412, although in practice, shifting the input to polynomial shifter 412 will not overflow the output to polynomial shifter 412 enough to require a reduction modulo the primitive polynomial.

The polynomials in R2, RT, W2, and WT are provided to a manipulator 430 as shown in FIG. 11, which provides the output values $M_a$ and $M_b$, where $$M_a = (H_T * R2) - (H_2 * RT)$$

and $$M_b = (H_T * W2) - (H_2 * WT),$$

where $H_2$ is the highest degree coefficient of the polynomial in R2, and $H_T$ is the highest degree coefficient of RT. For $GF(2^m)$, $H_2$ and $H_T$ are always equal to one. In the above formulae, R2, RT, W2, and WT represent the contents of the respective registers.

State machine 430 operates as follows. The external clock signal is supplied to the clock input of finite field divider 400 via line 432. The external clock is also provided to other elements of the finite field divider 400 as needed. At a predetermined evaluation time during each cycle of the clock, such as a rising edge, state machine 430 evaluates its inputs $I_{0-3}$ and decides which one of the outputs INIT, S1, S2, and S3, if any, will be asserted for the duration of that clock cycle. The asserted output indicates the state of state machine 430 and only one output is asserted during any given clock cycle. Thus, state machine 430 has five states: INIT, S1, S2, S3 and OFF, where the OFF state is indicated by no outputs being asserted. A new state is based solely on the inputs at the evaluation time and the current state.

If the external INIT signal on line 434 is asserted, the INIT state is entered, regardless of any other inputs or the current state. If the INIT input is not asserted and the current state is the INIT state, the new state is the S1 state, regardless of any other inputs. State machine 430 remains in the S1 state until either the INIT input is asserted or a signal at $I_1$ is asserted. If the INIT input is asserted, state machine 430 immediately changes to the INIT state, and if the $I_1$ signal is asserted at the evaluation time, state machine 430 changes from the S1 state to the S2 state. State machine 430 remains in the S2 state for one clock cycle. At the next evaluation time after entering the S2 state, if a signal at $I_2$ is asserted, state machine 430 changes from the S2 state to the S3 state, otherwise state machine 430 changes back to the S1 state. State machine 430 remains in the S3 state for one clock cycle. At the next evaluation time after entering the S3 state, if a signal at $I_3$ is asserted, state machine 430 changes from the S3 state to the OFF state, otherwise state machine 430 changes back to the S1 state. State machine 430 remains in the OFF state until the INIT input is asserted, at which time state machine 430 changes to the INIT state.

The operation of finite field divider 400 will now be described. A finite field division begins when the external INIT signal is asserted, and state machine 430 enters the INIT state. At this point, state machine 430 asserts an internal INIT signal thereby causing an external divisor value b(x) to load into R1 via multiplexer 402a and into RT via multiplexer 402c, causing an external primitive polynomial value p(x) to load into R2 via multiplexer 402b, causing an external dividend value a(x) to load into W1 via multiplexer 402d and into WT via multiplexer 402f, and causing a zero value to load into W2 via multiplexer 402e. Because each of the $I_x$ inputs to the multiplexers are coupled to the outputs of the register coupled to the multiplexer output, the contents of a particular register are unchanged if none of the control inputs to its respective multiplexer are asserted.

At an evaluation time of a clock cycle of the external clock signal on line 432, the state changes from the INIT state to the S1 state. In the S1 state, degree comparator 406 is enabled. If the degree of the polynomial in R2 is greater than the degree of the polynomial in RT, the first output of degree comparator 406 is asserted, and consequently, the $C_1$ inputs to multiplexers 402c, 402f are also asserted. The assertion of the $C_1$ inputs causes the output of polynomial shifter 412, SO1, to be loaded into RT, and the output of polynomial shifter 414, SO2, to be loaded into WT.

Once a new value is loaded into RT, the polynomial in RT will have the same degree as the polynomial in R2, since the polynomial in RT was shifted by the number of degrees of difference between R2 and RT. When the polynomials in R2 and RT have equal degrees, the first output of degree comparator 406 is deasserted, and the second output of degree comparator 406 is asserted, thereby causing the $M_a$ output of manipulator 418 to be loaded into R2, the $M_b$ output of manipulator 418 to be loaded into W2, and the state machine input $I_1$ to be asserted. Because the value $M_a$ is always a polynomial of lower degree than the polynomial in R2, due to the cancellation of the highest degree term in the subtraction performed by manipulator 418, the degree of the polynomial in R2 is always reduced by at least one in the S1 state. Significantly, the polynomial in W2 is manipulated by the same constants as the polynomial in R2.

At an evaluation time following the assertion of $I_1$, the state of state machine 430 changes to the S2 state. In the S2 state, degree comparator 408 is enabled. If, after the reduction in degree of the polynomial in R2, the degree is still not less than the degree of the polynomial in R1, the first output of degree comparator 408 is not asserted and the second output of degree comparator 408 is asserted. Because the second output of degree comparator 408 is coupled to an input of OR gate 422, which asserts an output signal when a signal is asserted at either of its inputs, the output signal of OR gate 422 is asserted.

When the OR signal, which is coupled to the $C_2$ control inputs of multiplexers 402c and 402f, is asserted, the polynomial in R1 is loaded into RT, and the polynomial in W1 is loaded into WT. If, at an evaluation time, the state is S2 and the $I_2$ input is not asserted, state machine 430 reverts to S1, where the cycle described above repeats. Eventually the transitions between the S1 state and the S2 state end because the degree of the polynomial in R2 is reduced each time state machine 430 enters the S1 state. When the degree of the polynomial in R2 is lower than the degree of the polynomial in R1, the first output of degree comparator 408 is asserted and the second output of degree comparator 408 is deasserted. When this happens, the $C_1$ control inputs to multiplexers 402a and 402d, and the $C_2$ control inputs to multiplexers 402b and 402e are also asserted. The assertion of these control inputs causes the contents of R1 and R2 to be swapped, and the contents of W1 and W2 to be swapped. At an evaluation time, with the $I_2$ input being asserted, the state of state machine 430 changes from the S2 state to the S3 state.

In the S3 state, degree checker 410 is enabled. If, after the swapping of the contents of R1 and R2, R1 contains a polynomial of degree zero, the first output of degree checker 410 is asserted, otherwise, the second output of degree checker 410 is asserted. Because the second output of degree checker 410 is coupled to an input of OR gate 422, the output of OR gate 422 is also asserted. When the OR signal, which is coupled to the $C_2$ control inputs of multiplexers 402c and 402f, is asserted, the polynomial in R1 is loaded into RT, and the polynomial in W1 is loaded into WT. If, at an evaluation time of the clock signal, the state is S3 and the $I_3$ input is not asserted, state machine 430 reverts to S1, where the S1-S2 and the S1-S2-S3 state cycles described above repeat. Eventually, the polynomial in R1 is reduced to a polynomial of degree zero, the first output of degree checker 410 is asserted, and the second output of degree checker 410 is deasserted. When this happens, the control input to two-input multiplexer 426 is asserted.

Two-input multiplexer 426 passes a first input, $I_0$, to its output when a signal at its control input is not asserted, and passes a second input, $I_1$, to its output when the signal is asserted. Thus, the contents of result register 428 are held constant until a signal is asserted at the control input to two-input multiplexer 426. When the first output of degree checker 410 is asserted, the polynomial in W1 is loaded into result register 428.

The first output of degree checker 410 also forms the $I_3$ input to state machine 430. If the $I_3$ input is asserted at a clock evaluation time, the state of state machine 430 changes from the S3 state to the OFF state. Thus, when R1 contains a polynomial of degree zero, the polynomial in W1 is loaded into result register 428, and state machine 430 changes to the OFF state. State machine 430 remains in the OFF state until the external INIT signal is asserted on line 434. Because degree checker 410 only asserts any of its outputs when the S3 signal is asserted, i.e., when state machine 430 is in the S3 state, the control input of two-input multiplexer 426 is not asserted and the contents of result register 428 remain constant until the first output of degree checker 410 is again asserted.

Because of the particular operation of the elements of finite field divider 400 as just described, the result held in result register 428 when state machine 430 is in the OFF state is c(x), the result of a finite field division of a(x) by b(x) using p(x) as the primitive polynomial.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A division circuit comprising:
 a first reference memory element, for holding a first reference value;
 a second reference memory element, for holding a second reference value;
 a third reference memory element, for holding a third reference value;
 a first divisor memory element, for holding a first value;
 a second divisor memory element, for holding a second value;
 a third divisor memory element, for holding a third value;
 an initialization circuit which loads a divisor element from a divisor input of the division circuit into said first reference memory element and said third reference memory element, loads a primitive polynomial at a primitive polynomial input Of the division circuit into said second reference memory element, loads a dividend element at a dividend input of the division circuit into said first divisor memory element and said third divisor memory element, and loads a zero value into said second divisor memory element, wherein said dividend element and said divisor element are elements of a finite field and are defined by said primitive polynomial;
 a polynomial shifter, coupled to said second and third reference memory elements and said third divisor memory element, for shifting said third reference memory element contents and said third divisor memory element contents by an equal number of degrees until said third reference memory element and said second reference memory element contain polynomials of equal degree, shifting of contents of said third divisor memory element being performed modulo the primitive polynomial;
 a manipulating circuit, coupled to said second and third reference memory elements, said second and third divisor memory elements, and said polynomial shifter, for loading said second reference memory element with a value equal to a first value subtracted from a second value, said first value being equal to a highest degree coefficient of said second reference value multiplied by said third reference value and said second value being equal to a highest degree coefficient of said third reference value multiplied by said second reference value, and said manipulating circuit for loading said second divisor memory element with a value equal to a third value subtracted from a fourth value, said third value being equal to a highest degree coefficient of said second reference value multiplied by said third divisor value and said fourth value being equal to a highest degree coefficient of said third reference value multiplied by said second divisor value;
 swapping means, coupled to said first and second reference memory elements and said first and second divisor memory elements for swapping contents of said first and second reference memory elements when said second reference memory element contains a polynomial of degree less than said first reference value, wherein said swapping means also swaps contents of said first and second divisor memory elements when said first and second reference memory element contents are swapped;
 loading means, coupled to said first and third reference memory elements and said first and third divisor memory elements, for loading said first reference value into said third reference memory element, wherein said loading means loads said first divisor value into said third divider memory element when said loading means loads said first reference value into said third reference memory element;
 decision means, coupled to said first reference memory element, for determining if said first reference value is a constant; and
 output means, coupled to said decision means and said first divisor memory element, for outputting said first divisor value upon said decision means indicating that said first reference value is a constant, said first divisor value being equal to a quotient element which is an element Of said finite field and a quotient of said dividend element divided by said divisor element over said finite field.

2. An algebraic decoder for decoding digital symbols represented by elements of a finite field, wherein elements of the finite field are defined by a primitive polynomial, the algebraic decoder comprising:

a dividend input which accepts a dividend element, said dividend element being an element of the finite field;

a divisor input which accepts a divisor element, said divisor element being an element of the finite field;

a first reference memory element;

a second reference memory element;

a first divisor memory element;

a second divisor memory element;

first initializing means for loading said divisor element into said first reference memory element;

second initializing means for loading the primitive polynomial into said second reference memory element;

third initializing means for loading the dividend into said first divisor memory element;

fourth initializing means for initializing said second divisor memory element to zero; and manipulating means coupled to said first and second reference memory elements, for manipulating contents of said first and second reference memory elements according to Euclid's algorithm which has been modified such that operations of Euclid's algorithm are reduced modulo the primitive polynomial; and operation linking means, coupled to said manipulating means and said first and second divisor memory elements, for parallelling said operations of said manipulating means with said first and second divisor memory elements, thereby reducing contents of said first divisor memory element to a quotient element upon completion of said modified Euclid's algorithm.

3. The algebraic decoder of claim 2, further comprising:

a de-interleaver coupled to an input of the algebraic decoder, for de-interleaving the digital symbols into polynomial elements;

a delay buffer coupled to an output of said de-interleaver; a syndrome calculator, coupled to said output of said de-interleaver, for calculating a syndrome; a key equation solver, coupled to an output of said syndrome calculator, for solving key equations;

polynomial evaluation means, coupled to an output of said key equation solver, for evaluating polynomials, said polynomial evaluation means further comprising a first output coupled to said dividend input for providing said dividend element to said third initializing means and said polynomial evaluation means further comprising a second output coupled to said divisor input for providing said divisor element to said first initializing means; and means coupled to said first divisor memory element and to said delay buffer, for providing decoded digital symbols at an output of the algebraic decoder.

4. A digital error-correcting receiver comprising the algebraic decoder of claim 3, and further comprising:

a signal input for receiving noisy digital symbols;

a signal path coupled to said signal input and said input to said de-interleaver, thereby providing said noisy by digital symbols to the algebraic decoder; and an output of the digital error-correcting receiver for providing said decoded digital symbols as an error-corrected estimation of said noisy digital symbols.

5. A digital filter for dividing, over a finite field, a dividend element by a divisor element to form a quotient element, wherein the dividend element, the divisor element, and the quotient element are each elements of the finite field, wherein elements of the finite field are defined by a primitive polynomial, the digital filter comprising:

a) a first reference register;
b) a second reference register;
c) a first divisor register;
d) a second divisor register;
e) initialization means, coupled to input ports of the digital filter, said reference registers and said divisor registers, for loading, as initial values, the divisor element into said first reference register, the primitive polynomial into said second reference register, the dividend element into said first divisor register, and zero into said second divisor register;
f) a manipulation circuit, comprising:
  1) a divider with inputs coupled to said first and second reference registers and outputs for a quotient and a remainder, said quotient and said remainder being results of a polynomial division of contents of said second reference register by contents of said first reference register;
  2) a first transfer circuit coupled between said first and second reference registers, for transferring contents of said first reference register into said second reference register;
  3) a second transfer circuit coupled between said divider and said first reference register, for transferring said remainder into said first reference register;
g) operation linker circuit, coupled to said manipulation circuit and said first and second divisor registers, for applying to said divisor registers operations which are parallel to operations applied to said first and second reference registers by said manipulation circuit, thereby reducing the dividend element to the quotient element when said modified Euclid's algorithm reaches a final step, said operation linkage circuit comprising:
  1) a multiplier coupled to said first divisor register and said divider, for forming a first intermediate result which is a polynomial multiplication of said first divisor register contents and said quotient;
  2) reducing means, coupled to said multiplier, for reducing said first intermediate result modulo the primitive polynomial in the finite field to form a second intermediate result;
  3) differential adder, coupled to said second divisor register and said reducing means, for forming a third intermediate result which is a polynomial subtraction difference of said second intermediate result and said second divisor register contents;
  4) third transfer circuit coupled between said first divisor register to said second divisor register for transferring contents of said first divisor register to said second divisor register; and 5) fourth transfer circuit for transferring said third intermediate result from said differential adder to said first divisor register; and h) output means, coupled to said operation linkage circuit, for outputting the quotient element so calculated.

6. A digital filter for dividing, over a finite field, a dividend element by a divisor element to form a quotient element, wherein the dividend element, the divisor element, and the quotient element are each elements of the finite field, wherein elements of the finite field are defined by a primitive polynomial, the digital filter comprising:

a first reference register;
a second reference register;
a first divisor register;
a second divisor register;
initialization means, coupled to input ports of the digital filter, said reference registers and said divisor registers, for loading, as initial values, the divisor element into said first reference register, the primitive polynomial into said second reference register, the dividend element into said first divisor register, and zero into said second divisor register; and manipulation means, coupled to said reference registers, for manipulating contents of said reference registers according to a modified Euclid's algorithm, wherein operations are modulo the primitive polynomial;

operation linkage means, coupled to said manipulation means and said divisor registers, for applying to said divisor registers operations corresponding to operations applied to said reference registers by said manipulation means, reducing the dividend element to the quotient element when said modified Euclid's algorithm reaches a final step; and output means, coupled to the operation linkage means, for outputting the quotient element so calculated.

7. The digital filter of claim 6, wherein the finite field is a $GF(q^m)$ finite field, wherein q is at least two and m is at least two.

8. The digital filter of claim 6, wherein the digital filter is an appropriately-programmed digital signal processing microprocessor.

9. The digital filter of claim 6, wherein the digital filter is an application specific integrated circuit.

10. The digital filter of claim 6, wherein said final step occurs when said first reference register contains a polynomial of degree zero, and wherein said manipulation means is configured to perform a plurality of intermediate operations on said reference registers which reduce said first reference register contents to said polynomial of degree zero.

11. The digital filter of claim 6, said manipulation means further comprising:

1) a divider with inputs coupled to said first and second reference registers and outputs for a quotient and a remainder, said quotient and said remainder being results of a polynomial division of contents of said second reference register by contents of said first reference register;

2) a first transfer means for transferring contents of said first reference register into said second reference register;

3) a second transfer means for transferring said remainder into said first reference register; and said operation linkage means further comprising:

1) a multiplier, coupled to said first divisor register and said divider, for forming a first intermediate result which is a polynomial multiplication of said first divisor register contents and said quotient;

2) reducing means, coupled to said multiplier, for reducing said first intermediate result modulo the primitive polynomial in the finite field to form a second intermediate result;

3) differential adder, coupled to said second divisor register and said reducing means, for forming a third intermediate result which is a polynomial subtraction difference of said second intermediate result and said second divisor register contents;

4) third transfer means for transferring contents of said first divisor register to said second divisor register; and 5) fourth transfer means for transferring said third intermediate result from said differential adder to said first divisor register.

12. The digital filter of claim 11, further comprising:
means for determining a degree of said remainder; and
means for outputting said first divisor register contents when said degree of said remainder is zero.

13. The digital filter of claim 11, further comprising means for outputting said first divisor register contents when said remainder is equal to one.

14. The apparatus of claim 6, wherein said registers are local CPU registers in a digital signal microprocessor.

15. The apparatus of claim 6, wherein said registers are memory locations in a random access memory.

16. The apparatus of claim 6, wherein said registers are shift registers in an application specific integrated circuit.

17. A division circuit comprising:

an input for accepting a continuous stream of operand pairs at a clock rate, an operand pair comprising a dividend element and a divisor element;

an input for accepting a primitive polynomial;

an initialization input for accepting an initialization signal;

a reference register which holds a reference value;

reference register initialization means, coupled to said initialization input and said reference register, for initializing said reference register value to a divisor element of a current operand pair when said initialization signal is asserted;

reference recursion logic for manipulating said reference value in response to a plurality of control signals applied at a plurality of inputs to said reference recursion logic;

a divider register which holds a divider register value;

divider register initialization means, coupled to said initialization input and said divider register, for initializing said divider register value to a dividend element from said current operand pair when said initialization signal is asserted;

divider recursion logic for manipulating said divider value in response to a plurality of control signals applied at a plurality of inputs to said divider recursion logic;

manipulation logic means, with a plurality of inputs coupled to said reference recursion logic and a plurality of control outputs, for controlling said reference recursion logic and said divider recursion logic, wherein said control outputs are coupled to said plurality of inputs to said reference recursion logic and to said plurality of inputs to said divider recursion logic, said manipulation logic means controlling said reference recursion logic to cause said reference recursion logic to manipulate said reference value into a finite field element of degree zero by evaluating said plurality of inputs, whereby said plurality of control outputs simultaneously controls said divider recursion logic to cause said divider recursion logic to manipulate said divider value from said dividend element into a quotient element for said current operand pair, wherein said quotient element is equal to a finite field division of said dividend element by said divisor element of said current operand pair modulo said primitive polynomial, where dividend elements, divisor elements, and quotient elements are each elements of a finite field;

manipulation logic initialization means coupled to said initialization input, for resetting said manipulation logic means in response to said initialization signal being asserted; and an output for providing a continuous output stream of quotient elements at the clock rate, including said quotient element of said operand pair.

18. The apparatus of claim 17, further comprising an output latch coupled to said initialization input and to said manipulation logic for holding said quotient element after it is output and until said initialization signal is asserted.

19. The apparatus of claim 17, wherein said primitive polynomial input accepts a continuous stream of primitive polynomial values at the clock rate, one for each operand pair.

20. The apparatus of claim 17, wherein said primitive polynomial input accepts a constant primitive polynomial value.

21. The apparatus of claim 17, wherein said primitive polynomial input accepts a constant primitive polynomial value from an internal circuit.

* * * * *